United States Patent
Henderson et al.

(10) Patent No.: US 10,832,354 B2
(45) Date of Patent: Nov. 10, 2020

(54) ENERGY KEY PERFORMANCE INDICATORS FOR THE INDUSTRIAL MARKETPLACE

(71) Applicant: Rockwell Automation Technologies, Inc., Mayfield Heights, OH (US)

(72) Inventors: Noel Henderson, Milton, FL (US); David C. Mazur, Mequon, WI (US); Scott D. Day, Richfield, WI (US); Rob A. Entzminger, Shawnee, KS (US); Le Roy G. Howe, Hickory, NC (US); Jeffrey Schmelebeck, Oak Creek, WI (US); Bruce K. Venne, Oak Creek, WI (US)

(73) Assignee: ROCKWELL AUTOMATION TECHNOLOGIES INC., Mayfield Heights, OH (US)

(*) Notice: Subject to any disclaimer, the term of this patent is extended or adjusted under 35 U.S.C. 154(b) by 774 days.

(21) Appl. No.: 15/364,129

(22) Filed: Nov. 29, 2016

(65) Prior Publication Data

US 2018/0150917 A1 May 31, 2018

(51) Int. Cl.
*G06Q 50/06* (2012.01)
*G06Q 10/06* (2012.01)

(52) U.S. Cl.
CPC ....... *G06Q 50/06* (2013.01); *G06Q 10/06393* (2013.01); *Y02P 80/10* (2015.11)

(58) Field of Classification Search
None
See application file for complete search history.

(56) References Cited

U.S. PATENT DOCUMENTS

| | | | | |
|---|---|---|---|---|
| 7,065,426 B2* | 6/2006 | Valentini | .......... | G05B 19/41875 700/111 |
| 9,785,902 B1* | 10/2017 | Fontaine | ............ | G06Q 10/0635 |
| 10,054,936 B2* | 8/2018 | Gobalakrishnan | ........................... | G05B 19/41865 |
| 2002/0099463 A1* | 7/2002 | Sakaguchi | ....... | G05B 19/41875 700/111 |

(Continued)

OTHER PUBLICATIONS

Barletta, I. ; Andersson, J. ; Johansson, B. et al. (2014) "Assessing a proposal for an energy based overall equipment effectiveness indicator through discrete event simulation", Proceedings of the 2014 Winter Simulation Conference pp. 1096-1107 (Year: 2014).*

*Primary Examiner* — Lina M Cordero (57) ABSTRACT

Provided herein are systems, methods, and software for calculating energy effectiveness in an industrial automation system. In one implementation, a computing system is directed to at least acquire production energy information indicating the amount of energy used by a machine during a processing period to process one or more parts and acquire process energy information indicating the sum of energy used by the machine during the processing period to process the one or more parts and to not process any parts. The computing system also acquires a total number of parts expected to be processed during the processing period and a total number of good parts processed during the processing period. An overall equipment energy effectiveness is calculated based on a ratio of the production energy information to the process energy information and based on a ratio of the total number of good parts to the total number of parts.

20 Claims, 6 Drawing Sheets

(56) References Cited

U.S. PATENT DOCUMENTS

| | | | |
|---|---|---|---|
| 2002/0138169 A1* | 9/2002 | Sakaguchi | G06Q 10/06 700/108 |
| 2004/0034555 A1* | 2/2004 | Dismukes | G06Q 10/06 700/120 |
| 2004/0117050 A1* | 6/2004 | Oskin | G05B 23/0267 700/108 |
| 2004/0148047 A1* | 7/2004 | Dismukes | G05B 19/41865 700/100 |
| 2008/0010109 A1* | 1/2008 | Ide | G06Q 10/0631 705/7.12 |
| 2008/0256406 A1* | 10/2008 | Arnold | G01R 31/31912 714/727 |
| 2010/0332275 A1* | 12/2010 | Walsh | G06Q 10/06 705/7.37 |
| 2016/0180269 A1* | 6/2016 | Shimoda | G06Q 50/06 705/7.22 |
| 2016/0307136 A1* | 10/2016 | Packowski | G06Q 10/06314 |
| 2017/0256986 A1* | 9/2017 | Demachi | G05B 19/418 |

* cited by examiner

| Asset | Measured Energy (kW) | Blocked Energy (kW) | Starved Energy (kW) | Downtime Energy (kW) | Unproductive Energy (kW) | Allocated Energy (kW) | Productive Energy (kW) | Energy Liability (kW) | % Working Energy (kW) | % Energy Liability (kW) | Total parts | Good Parts (units) | Part Quality (units) | OEEE | Re-allocated OEEE |
|---|---|---|---|---|---|---|---|---|---|---|---|---|---|---|---|
| Line 1 | 140 | 5 | 5 | 5 | 15 | 15 | 125 | 140 | 100% | 100% | 100 | 100 | 80% | 80% | 80% |
| Mixer | 20 | 2 | 0 | 0 | 2 | 0 | 18 | 18 | 14% | 13% | 100 | 95 | 95% | 14% | 12% |
| Oven | 30 | 3 | 0 | 0 | 3 | 0 | 27 | 27 | 21% | 19% | 95 | 85 | 89% | 19% | 17% |
| Slicer | 50 | 0 | 0 | 5 | 5 | 15 | 45 | 60 | 36% | 43% | 85 | 80 | 94% | 34% | 40% |
| Packager | 40 | 0 | 5 | 0 | 5 | 0 | 35 | 35 | 29% | 25% | 80 | 80 | 100% | 29% | 25% |

ENERGY KEY PERFORMANCE INDICATORS FOR THE INDUSTRIAL MARKETPLACE

TECHNICAL FIELD

Aspects of the disclosure are related to manufacturing equipment and processes, and in particular, to manufacturing equipment and processes in industrial automation applications.

BACKGROUND

With regard to manufacturing equipment or processes, process indicators (e.g., cost per unit, time per unit, etc.) may be indicative of overall equipment effectiveness (OEE). OEE quantifies how well a manufacturing system performs relative to its designed capacity. For example, OEE may quantify availability, performance, and quality. Availability represents the percentage of scheduled time (i.e., uptime) that the operation is available to operate. Performance represents the speed at which the machine or process runs as a percentage of its designed speed, and quality represents the good units produced as a percentage of the total units started.

While the traditional OEE equation quantifies availability, performance, and quality, other manufacturing metrics may further elucidate the effectiveness of the manufacturing equipment or processes. For example, in order to be functional in some manufacturing processes, certain manufacturing equipment requires energy to operate. The traditional OEE equation that incorporates the availability and performance of a machine or other manufacturing equipment during the manufacturing process fails to indicate effectiveness of the equipment or process based on the energy used and properly allocated during the process.

OVERVIEW

Provided herein are systems, methods, and software for calculating energy effectiveness in an industrial automation system. In one implementation, one or more computer-readable storage media having program instructions stored thereon to calculate energy effectiveness in an industrial automation system, wherein the program instructions, when executed by a computing system, direct the computing system to at least acquire production energy information indicating the amount of energy used by a machine of the industrial automation system during a processing period in which the machine was processing one or more parts configured to be processed by the machine and acquire process energy information indicating the sum of energy used by the machine during the processing period in which the machine was processing the one or more parts and in which the machine was not processing any parts. The instructions further direct the computing system to acquire a total part value indicating the total number of parts expected to be processed by the machine during the processing period, acquire a good part value indicating the total number of good parts processed by the machine during the processing period, calculate an overall equipment energy effectiveness (OEEE) of the industrial automation system based on a ratio of the production energy information to the process energy information and based on a ratio of the good part value to the total part value, and display the OEEE to a user.

In another implementation, a method for calculating energy effectiveness in an industrial automation system comprises acquiring production energy information indicating the amount of energy used by a machine of the industrial automation system during a processing period in which the machine was processing one or more parts configured to be processed by the machine and acquiring process energy information indicating the sum of energy used by the machine during the processing period in which the machine was processing the one or more parts and in which the machine was not processing any parts. The method further comprises acquiring a total part value indicating the total number of parts expected to be processed by the machine during the processing period, acquiring a good part value indicating the total number of good parts processed by the machine during the processing period, calculating an overall equipment energy effectiveness (OEEE) of the industrial automation system based on a ratio of the production energy information to the process energy information and based on a ratio of the good part value to the total part value, and displaying the OEEE to a user.

In another implementation, a system to calculate energy effectiveness in an industrial automation system comprises an upstream machine configured to perform a first function to produce a first measurable outcome, an industrial machine configured to perform a second function based on the first measurable outcome to produce a second measurable outcome, a downstream machine configured to perform a third function based on the second measurable outcome to produce a third measurable outcome, and a controller. The controller is programmed to acquire production energy information indicating the amount of energy used by each of the upstream, industrial, and downstream machines to respectively perform the first, second, and third functions during a processing period; and acquire a success value indicating the total number of successful performances of the first, second, and third functions respectively processed by the upstream, industrial, and downstream machines during the processing period. The controller is also programmed to acquire total energy information indicating the sum of energy respectively used by the upstream, industrial, and downstream machines during the processing period in which the first, second, and third functions were respectively performed and in which the no functions were respectively performed by the upstream, industrial, and downstream machines; acquire a total outcome value indicating the total number of measurable outcomes expected to be produced by the respective upstream, industrial, and downstream machines during the processing period; and calculate an overall equipment energy effectiveness (OEEE) for each of the upstream, industrial, and downstream machines based on a respective ratio of the production energy information to the total energy information and based on a respective ratio of the success values to the total outcome value.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations described herein provide for OEE calculation taking energy used in the manufacturing process into account. In at least one implementation disclosed herein, energy used by one machine because of a delay caused by another machine is attributed to the delay-causing machine. In this manner, the OEE with energy calculation results may be analyzed to identify potential issue spots for further analysis and/or maintenance.

Figure 1:
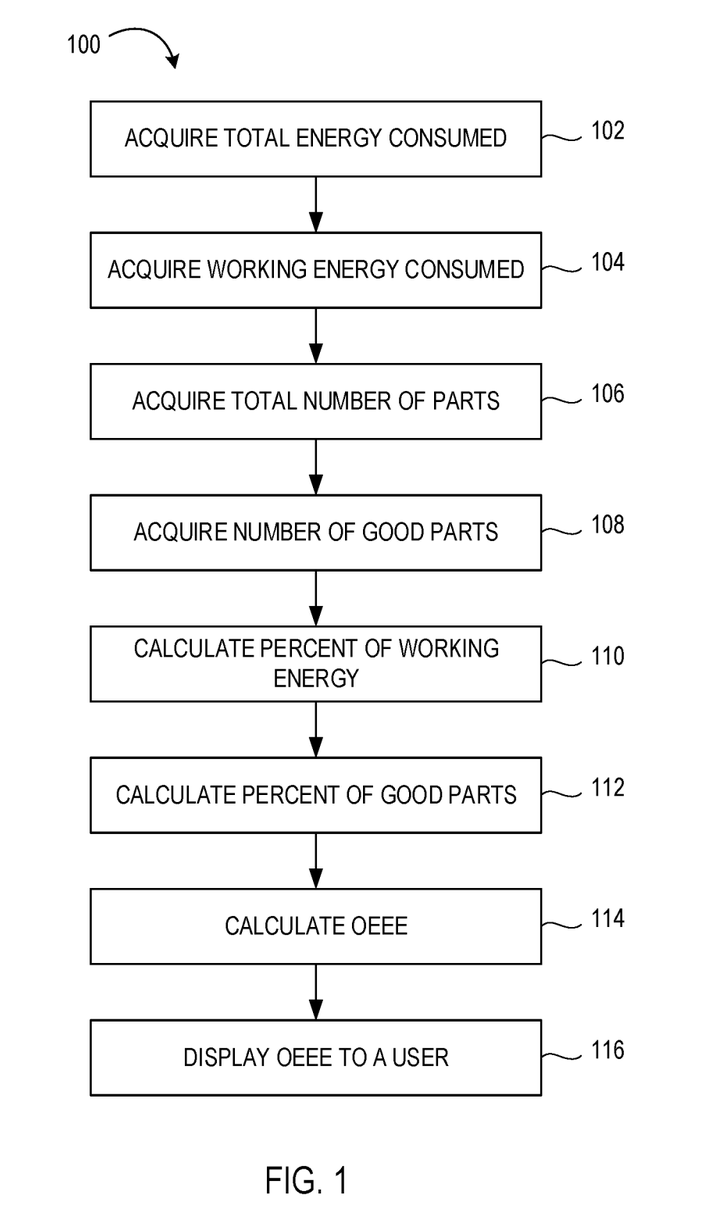
FIG. 1 illustrates a flow diagram that illustrates an operation for calculating overall equipment energy effectiveness in a manufacturing system in an exemplary implementation.

FIG. 1 illustrates a flow diagram that illustrates an operation 100 for calculating overall equipment energy effectiveness (OEEE) of a manufacturing system in an exemplary implementation. A manufacturing or industrial system for which the OEEE may be calculated may comprise, for example, an automobile manufacturing factory, a food processing plant, an oil drilling operation, a microprocessor fabrication facility, or some other type of industrial enterprise. Calculation of the OEEE determines, from the total energy consumed in the manufacturing or industrial system during a given period of time, what portion of that energy went towards making sellable or usable product. The energy information can be provided from the power distribution system, process control system, manual entry, or any other energy source available to the facility. OEEE may be calculated according to the following equation:

$$\left(\frac{\text{Working Energy Consumed}}{\text{Total Energy Consumed}}\right) \times \left(\frac{\text{Good Parts}}{\text{Total Parts}}\right). \quad \text{(Eqn. 1)}$$

where the total energy consumed is the total amount of energy used during a given measurement period (e.g., a production shift), the working energy consumed is the amount of energy used during working periods within the given period, good parts is the number of parts or units produced that meet expectations versus the total amount of parts started or intended to be produced including parts that do not meet expectations and are discarded or otherwise disposed of.

While the examples and discussion herein refer to parts that are produced or processed by machines at output units, other types of output units are allowed within the scope of the embodiments of the invention described herein. For example, a machine may perform a service that does not process a part or supply material into a different part. In this case, the service may be considered to be the part processed by the machine. Any function for which the machine is designed to perform may be counted as a "part" for the purposes of this disclosure even though a physical unit may not be a result of the outcome of performing the function.

To begin the calculation of finding the OEEE of a manufacturing system or process, operation 100 begins with acquiring the total energy consumed 102, the working energy consumed 104, the number of total parts 106, and the number of good parts 108. The energy and part information may be obtained from previously measured values stored in a database or may be obtained on the fly. In one embodiment, the data may be stored in a data historian of a manufacturing system. The part produced by any one machine may not be the final part ready for sale or use in some other manner. For example, in a serial-type production line, the "part" produced by a mixing machine may be a mixture of a plurality of ingredients for use by a downstream machine such as an oven or pressure machine configured to process the mixture into a different form. Each machine may be configured to continue working on a supplied "part" by an upstream machine until a final, sellable good part is produced at the end of the process. Accordingly, the "part" each machine is configured to produce is relative to what the machine is configured to produce, and this part may not be the final part ready for sale or use. Table 1 below includes sample numbers for an example manufacturing process. For example, Table 1 may represent data from a single work shift at a manufacturing facility.

TABLE 1

| | | |
|---|---|---|
| Total Energy Consumed (TEC) | 80 | kWh |
| Working Energy Consumed (WEC) | 65 | kWh |
| Percent Working Energy (PWE) | 81% | |
| Total Parts (TP) | 100 | units |
| Sellable (Good) Parts (SP) | 90 | units |
| Percent Good Parts (PGP) | 90% | |

After the data are acquired, a percent of working energy (PWE) is calculated 110 in the first half of Eqn. 1 by dividing the working energy consumed by the total energy consumed. The percent of good parts (PGP) is calculated 112 in the second half of Eqn. 1 by dividing the number of sellable, approved, or otherwise good parts or units produced by the number of total parts or units that were expected to be produced. By multiplying the PWE by the PGP, the OEEE can then be determined 114. Once calculated, the OEEE value can be displayed 116 to a user or put into a human-readable report for consideration and/or analysis.

While operation 100 can be used to determine the OEEE for the entire manufacturing system, for a sub-group (e.g., a manufacturing line) of the manufacturing system, or even for a particular machine or asset in the manufacturing process, a more detailed analysis of the OEEE may be desirable. For instance, the percent of working energy of an entire line of manufacturing machines may not tell the complete story about the efficiency of the individual machines relative to the energy used. As used herein, machine refers to any machine, asset, or other manufacturing system component using energy during the manufacturing process.

Figure 2:
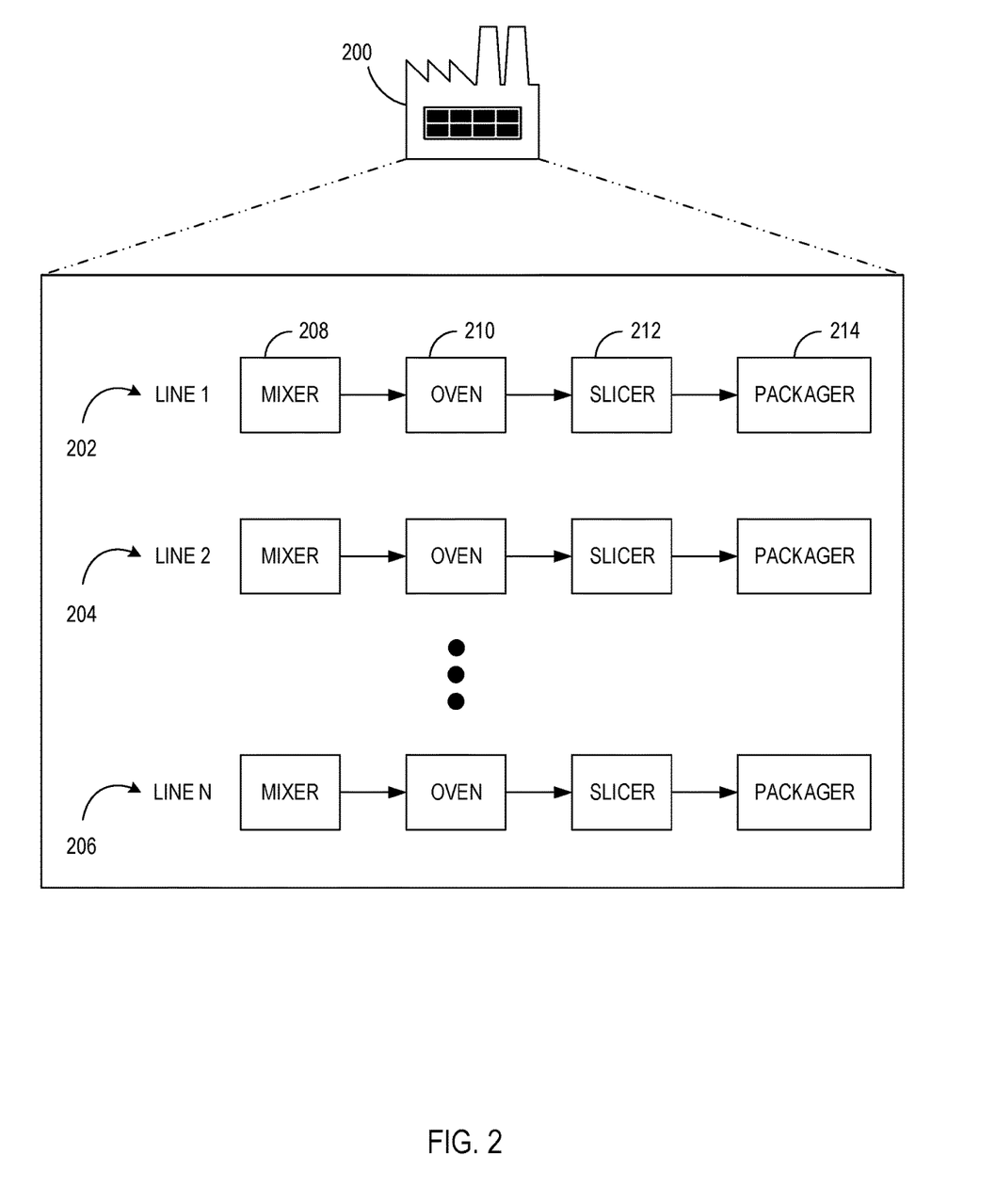
FIG. 2 illustrates a block diagram of an industrial automation environment.

FIG. 2 illustrates a simplified bakery factory 200 comprising multiple manufacturing lines 202, 204, 206 in an exemplary embodiment. A plurality of machines in each line 202-206 includes a mixer 208, an oven 210, a slicer 212, and a packager 214. While illustrated in this example as being machined configured to perform distinct function, in other embodiments, two or more machined of a multi-machine system may be configured to perform the same or similar functions. In a well-optimized line, the mixer 208 may create a batch of product (e.g., a supply of mixed dough) and supply the product to the oven 210 that is available to take the mixer's product as soon as the mixer is able to supply it. Thereafter, the mixer 208 may begin preparing another batch of product to take advantage of available run-time. The oven 210, having received the mixed dough, may bake the dough and supply baked product to the slicer 212, which available to receive it. Thereafter, the oven 210 may then receive another batch of mixed dough from the mixer 208. Similar optimum operations of the slicer 212 and packager 214 may exist such that no machine experiences down-time and is producing its portion of the final product 100% of the time.

In this well-optimized example, the manufacturing lines 202-206 are running at 100% efficiency where none of the machines 208-214 experience inefficiencies such as 1) periods of blockages where they are able to supply finished product to the next downstream machine but the downstream machine is not available to receive it, 2) periods of starvation where they are able to receive product from an upstream machine but the upstream machine is not yet able to supply it, or 3) periods of down time or idle time where they are themselves the cause of downstream blockage or upstream starvation. Other inefficiencies of energy usage may be caused by potential stored energy, other types of non-productive states of the machine caused by upstream or downstream machines not being able to perform or operate, or if there is nothing for the machine to do. When the manufacturing lines 202-206 are running at 100% efficiency, the calculation of OEEE according to Eqn. 1 above may suffice for a user's understanding of the efficiency of the lines 202-206. However, the global evaluation of the entire manufacturing line using operation 100 does not elucidate a more granular view of the efficiency of the line when the machines 208-214 work at less than 100% efficiency. Furthermore, evaluating each machine 208-214 separately using operation 100 does not represent a fuller understanding of the OEEE of the machine as may come from incorporating less than 100% efficiencies into the calculation.

Figure 3:
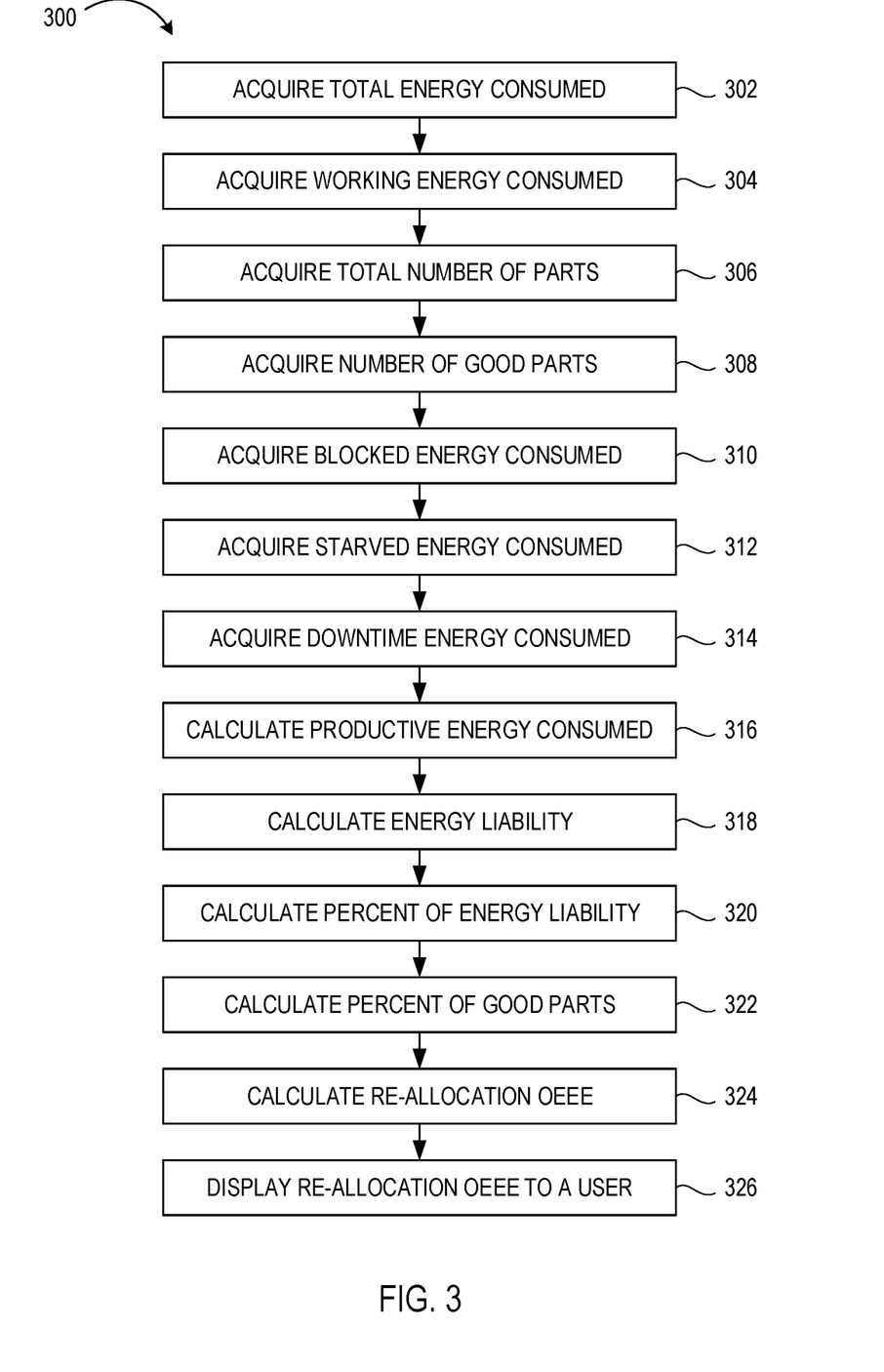
FIG. 3 illustrates a flow diagram that illustrates an operation for allocating energy usage in a manufacturing system in an exemplary implementation.

Therefore, FIG. 3 illustrates a flow diagram that illustrates an operation 300 for calculating an OEEE that takes inefficiencies of a manufacturing system into account in an exemplary implementation. Operation 300 acquires inefficiency data and re-allocates the inefficiency data to the appropriate machine to provide a more complete OEEE of the manufacturing system. Calculation of the OEEE according to operation 300 determines which machines were inefficient due to blockage or starvation and re-allocates or assigns the portion of their energy consumed during such inefficient periods to the downed machine causing such inefficiencies in order to penalize the downed machine rather than the machine that is available to produce product but cannot because of the downed machine.

To begin the calculation of finding the OEEE of a manufacturing system or process and referring to FIGS. 2 and 3, operation 300 begins with acquiring 302 the total energy consumed by each machine 208-214 of one or more lines 202-206, acquiring 304 the working energy consumed by each machine 208-214, the number of total parts 306 intended to be produced by each machine 208-214, and the number of good parts 308 actually produced by each machine 208-214. Operation 300 further includes acquiring, for each machine 208-214, the energy consumed during any period of time in which it was not productive due to blockage 310 because of a downstream machine, starvation 312 because of an upstream machine, and/or its own down time 314 because of a fault or other issue in the machine. The acquired data information may be obtained from previously measured values stored in a database or may be obtained on the fly. In one embodiment, the data may be stored in a data historian of a manufacturing system.

After the data are acquired, productive energy consumed (PEC) for each machine 208-214 may be calculated 316 according to:

$$\text{Total Energy Consumed} - \text{Unproductive energy} \quad \text{(Eqn. 2)},$$

where the unproductive energy is a summation of the blocked energy, the starved energy, and the downtime energy of each machine 208-214.

Next, an energy liability for each machine 208-214 is calculated 318 according to:

$$\text{Productive energy} + \text{Allocated energy modification} \quad \text{(Eqn. 3)},$$

where the allocated energy modification is a summation of the energy measured during downtime periods of a particular machine as well as any blocked energy of an upstream machine and any starved energy of a downstream machine caused by the period of down time by the particular machine. The energy liability calculation thus re-assigns or allocates unproductive energy to the machine 208-214 causing the unproductive energy. For each machine 208-214 experiencing periods of down time, the energy measured during such downtime periods as well as any upstream blocked energy and any downstream starved energy caused by machine down time is assigned to the responsible machine. In the case where multiple machines 208-214 experience periods of down time, timestamps of the relative measured unproductive energy may be used to properly assign unproductive energy to the appropriate machine 208-214.

A re-allocation OEEE for each machine 208-214 of the one or more lines 202-206 may then be based on the following equation:

$$\left(\frac{\text{Energy Liability}}{\text{Total Energy Consumed}}\right) \times \left(\frac{\text{Good Parts}}{\text{Total Parts}}\right), \quad \text{(Eqn. 4)}$$

where the total energy consumed is the total amount of energy used by all machines 208-214 of one or more lines 202-206 during a given measurement period.

In Eqn. 4, a percent of energy liability (PEL) is calculated 320 by dividing the energy liability of consumed energy by the total energy consumed by all machines under consideration. A part quality that indicates the percent of good parts (PGP) is calculated 322 by dividing the number of sellable, approved, or otherwise good parts or units produced by the number of total parts or units that were expected to be produced. By multiplying the PEL by the PGP, the re-allocation OEEE can then be determined 324. Once calculated, the re-allocation OEEE value can be displayed 326 to a user or put into a human-readable report for consideration and/or analysis.

Figure 4:
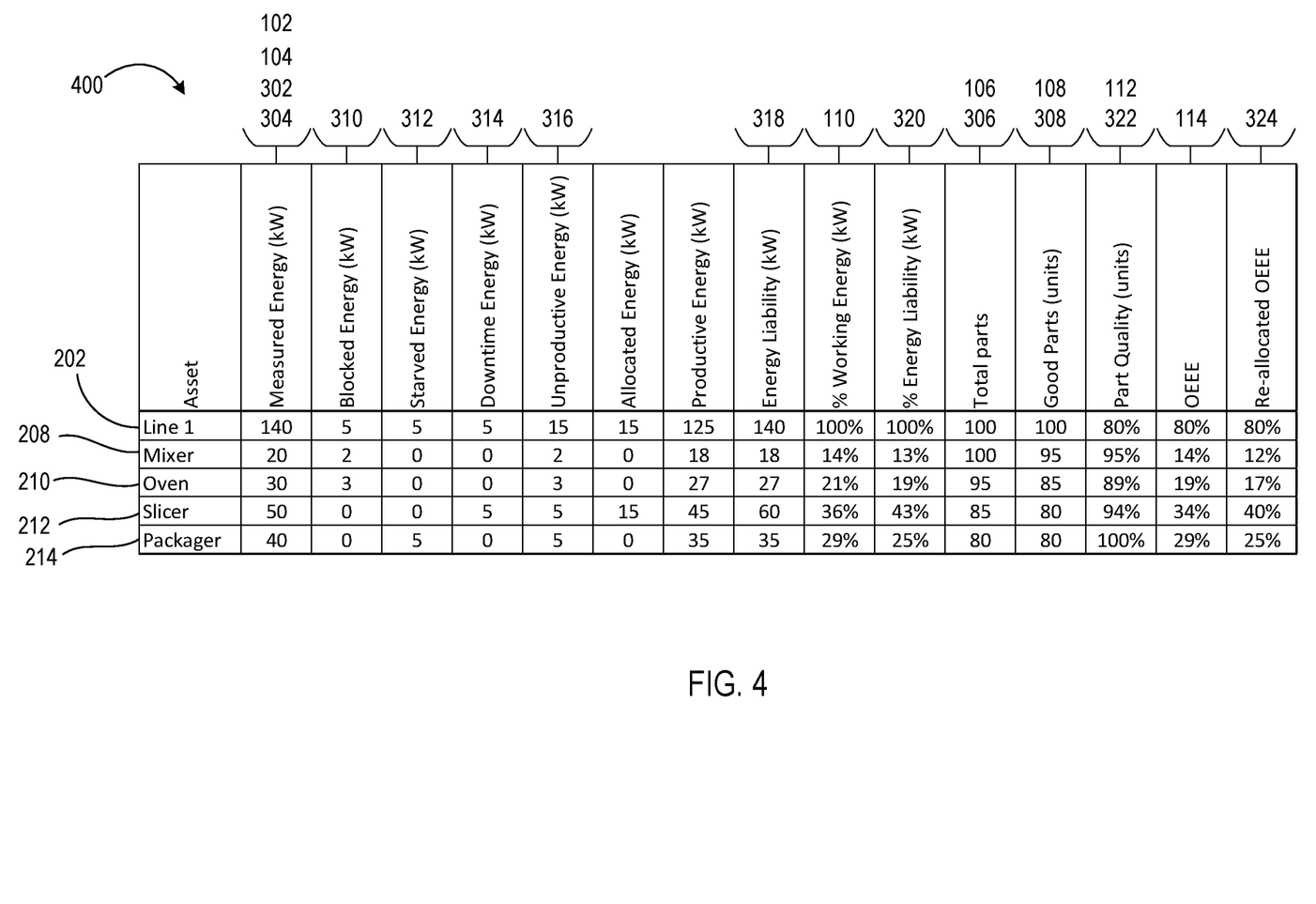
FIG. 4 illustrates a text chart with sample data in an exemplary implementation.

FIG. 4 illustrates a text chart 400 with sample data measured during an employee shift at factory 200 for discussion with respect to operations 100 and 300. The data shown in chart 400 shows sample data for line 1 202 of factory 200. Data for the mixer 208, oven 210, slicer 212, and packager 214 are shown. Process steps related to respective operations 100 and 300 are displayed above the relevant chart column.

In the example data shown, slicer 212 experienced some down time during the shift. This down time resulted in 5 kW of unproductive energy being used by slicer 212. Because of the down time of slicer 212, both the mixer 208 and the oven 210 experienced 2 kW and 3 kW of unproductive blocked energy, respectively, since slicer 212 could not receive product during its down time. In addition, packager 214 experienced 5 kW of starved unproductive energy for being available to receive product but being starved of product due to the slicer 212 not supplying product during its down time.

As shown, the unproductive energy calculated in step 316 of operation 300 resulted in a total unproductive energy of 15 kW. Since slicer 212 was the only machine to suffer down time during this shift and since the unproductive blocked and starved energies experienced by mixer 208, oven 210, and packager 214 were due to the down time of slicer 212, all of the energy of the unproductive blocked and starved energies is re-allocated to the slicer 212 in step 318 of operation 300.

The percent of working energy (PWC) calculated in step 110 and the percent of energy liability (PEL) calculated in step 320 are illustrated side-by-side in chart 400, and differences between this data can be seen. Since operation 100 does not take energy liability into consideration, the PWC data show an accurate measurement of the energy used by the respective machines, but the values for the mixer 208, oven 210, and packager 214 are higher than they should be and the value for the slicer 212 is lower than it should be because of the down time of slicer 212. Accordingly, the PEL data re-allocates the energy usage to the cause of the extra energy used.

The total parts column shows that, for the shift, 100 units were expected to be produced. However, the first machine in the process (i.e., mixer 208) only produced 95 good/approved units. Since the units produced by each machine 208-212 in line 1 202 are used to supply starting material for the next units 210-214, products that fail to pass inspection or to otherwise be labelled as not good units are not counted against the part quality of the downstream units. That is, since mixer 208 produced 5 bad parts, those bad parts are not counted against the oven 210 in being able to successfully produce its parts. Accordingly, the total number of good parts expected to be produced by each downstream machine is reduced by the number of bad parts produced by upstream machines.

While chart 400 illustrates a simple example, a more advanced data analysis may be considered. For example, if the parts exiting any one machine are determined to be bad prior to their introduction to the next machine, the bad part may be removed from the process such that it is not supplied to downstream machines for further processing. In this case, the downstream machines would experience starved energy states that could be re-allocated to the machine producing the bad part. Alternatively, if the bad part is allowed to be processed by the downstream machines to the conclusion of the process, the energy expended by the downstream machines may be allocated back to the machine producing the bad part. In this case, a more detailed measurement of the energy used based on a part-by-part basis can be used to attribute the relevant bad-part-processing energy to the machine that produced the bad part.

Figure 5:
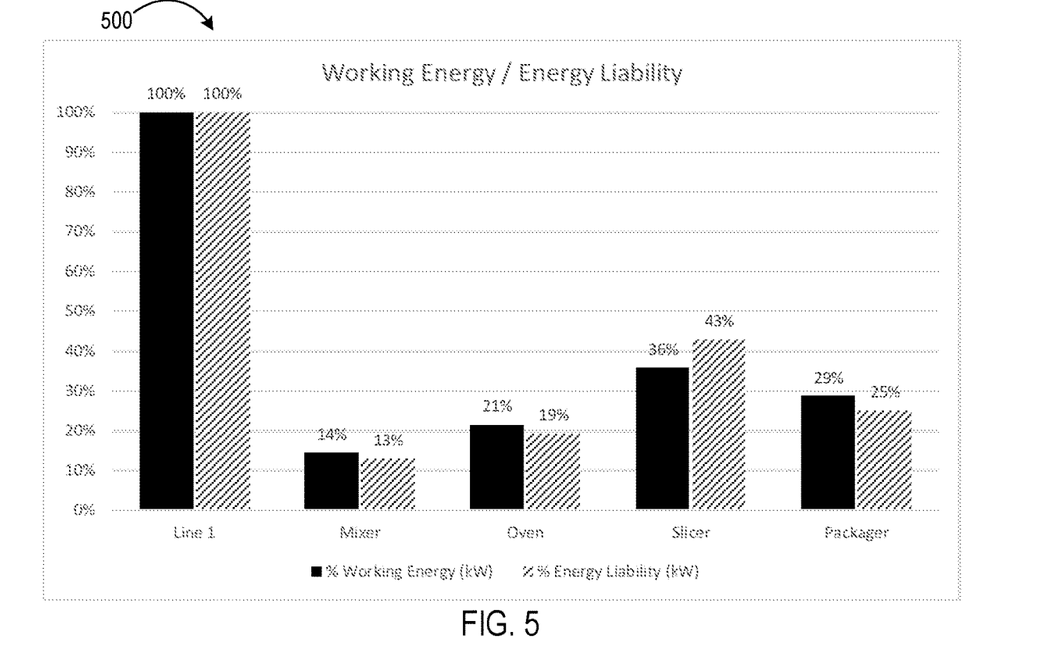
FIG. 5 illustrates a graphical chart of some of the data of the text chart of FIG. 4 in an exemplary implementation.
Figure 6:
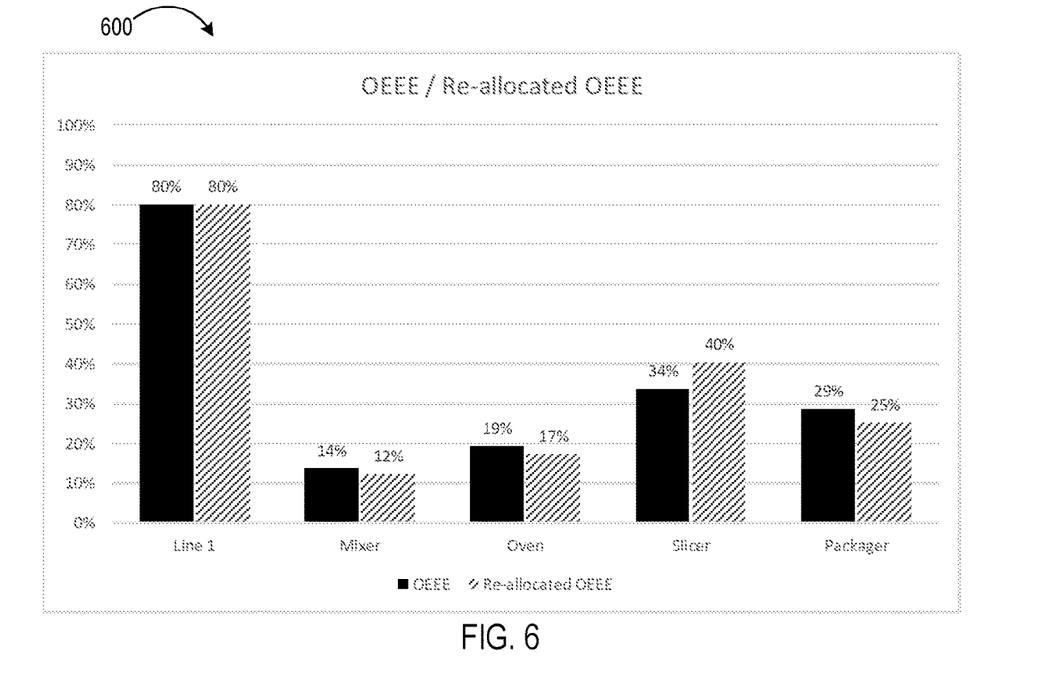
FIG. 6 illustrates a graphical chart of some of the data of the text chart of FIG. 4 in an exemplary implementation.

FIGS. 5 and 6 illustrate graphical charts 500, 600 respectively corresponding to the PWE and PEL data of chart 400, and the OEEE and re-allocated OEEE data of chart 400. The differences between the data can be seen side-by-side, and one can analyze this graphical data to compare how the data prepared by operation 100 and operation 300 can be presented to a user for further analysis.

Figure 7:
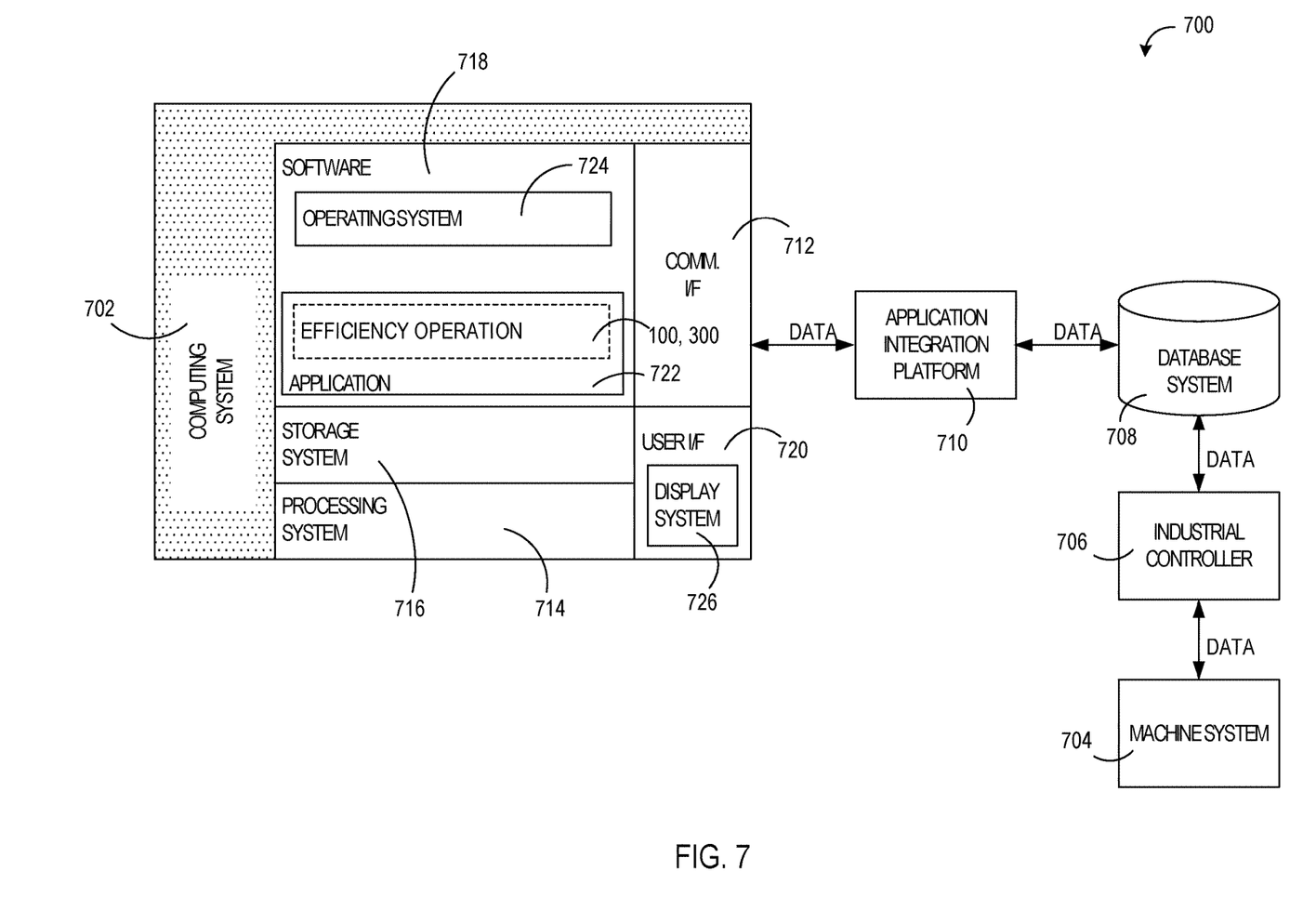
FIG. 7 illustrates an industrial automation environment in an exemplary implementation.

Turning now to FIG. 7, a block diagram that illustrates an industrial automation environment 700 in an exemplary implementation is shown. Industrial automation environment 700 provides an example of an industrial automation environment that may be utilized to implement the OEEE calculation operation 100 and the re-allocation OEEE calculation operation 300 (referred together as "OEEE operations") disclosed herein, but other environments could also be used. Industrial automation environment 700 includes computing system 702, machine system 704, industrial controller 706, database system 708, and application integration platform 710. Machine system 704 and controller 706 are in communication over a communication link, controller 706 and database system 708 communicate over a communication link, database system 708 and application integration platform 710 communicate over a communication link, and application integration platform 710 and computing system 702 are in communication over a communication link. Note that there would typically be many more machine systems in most industrial automation environments, but the number of machine systems shown in FIG. 7 has been restricted for clarity.

Industrial automation environment 700 comprises an automobile manufacturing factory, food processing plant, oil drilling operation, microprocessor fabrication facility, or some other type of industrial enterprise. Machine system 704 could comprise a sensor, drive, pump, filter, drill, motor, robot, fabrication machinery, mill, printer, or any other industrial automation equipment, including their associated control systems. A control system comprises, for example, industrial controller 706, which could include automation controllers, programmable logic controllers (PLCs), programmable automation controllers (PACs), or any other controllers used in automation control. Additionally, machine system 704 could comprise other industrial equipment, such as a brew kettle in a brewery, a reserve of coal or other resources, or any other element that may reside in an industrial automation environment 700.

Machine system 704 continually produces operational data over time. The operational data indicates the current status of machine system 704, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 704 and/or controller 706 is capable of transferring the operational data over a communication link to database system 708, application integration platform 710, and computing system 702, typically via a communication network. Database system 708 could comprise a disk, tape, integrated circuit, server, or some other memory device. Database system 708 may reside in a single device or may be distributed among multiple memory devices.

Application integration platform 710 comprises a processing system and a communication transceiver. Application integration platform 710 may also include other components such as a router, server, data storage system, and power supply. Application integration platform 710 provides an example of application server 130, although server 130 could use alternative configurations. Application integration platform 710 may reside in a single device or may be distributed across multiple devices. Application integration platform 710 may be a discrete system or may be integrated within other systems—including other systems within industrial automation environment 700. In some examples, application integration platform 710 could comprise a FactoryTalk® VantagePoint server system provided by Rockwell Automation, Inc.

The communication links over which data is exchanged between machine system 704, industrial controller 706, database system 708, application integration platform 710, and communication interface 712 of computing system 702 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 702 may be representative of any computing apparatus, system, or systems on which the event data saving processes disclosed herein or variations thereof may be suitably implemented. Computing system 702 provides an example of a computing system that could be used as either a server or a client device in some implementations, although such devices could have alternative configurations. Examples of computing system 702 include mobile computing devices, such as cell phones, tablet computers, laptop computers, notebook computers, and gaming devices, as well as any other type of mobile computing devices and any combination or variation thereof. Examples of computing system 702 also include desktop computers, server computers, and virtual machines, as well as any other type of computing system, variation, or combination thereof. In some implementations, computing system 702 could comprise a mobile device capable of operating in a server-like fashion which, among other uses, could be utilized in a wireless mesh network.

Computing system 702 includes processing system 77, storage system 716, software 718, communication interface 712, and user interface 720. Processing system 77 is operatively coupled with storage system 716, communication interface 712, and user interface 720. Processing system 77 loads and executes software 718 from storage system 716. Software 718 includes application 722 and operating system 724. Application 722 may include event data saving processes 100, 300 in some examples. When executed by computing system 702 in general, and processing system 77 in particular, software 718 directs computing system 702 to operate as described herein for event data saving processes 100, 300 or variations thereof. In this example, user interface 720 includes display system 726, which itself may be part of a touch screen that also accepts user inputs via touches on its surface. Computing system 702 may optionally include additional devices, features, or functionality not discussed here for purposes of brevity.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more non-transitory computer-readable storage media having program instructions stored thereon to provide equipment energy effectiveness information for an industrial automation system, wherein the program instructions, when executed by a computing system, direct the computing system to at least:

via one or more processors that track an amount of energy used by the industrial automation system, acquire production energy information indicating a sum of energy used by each machine of one or more machines of the industrial automation system during a processing period comprising a production period in which a machine of the one or more machines is active in an industrial automation process and a down period in which the machine is inactive in the industrial automation process;

via the one or more processors that track the amount of energy used by the industrial automation system, acquire process energy information of the machine indicating an amount of energy used by the machine during the processing period;

via the one or more processors that track the amount of energy used by the industrial automation system, acquire unproductive energy information indicating a sum of energy used by at least one of an upstream machine and a downstream machine during at least a portion of the down period, wherein the sum of energy used by at least one of the upstream machine and the downstream machine was consumed at least due to the machine being inactive in the industrial automation process;

combine the unproductive energy information with the process energy information of the machine to generate modified process energy information of the machine;

acquire a total part value of the machine indicating a total number of parts expected to be processed by the machine during the processing period;

acquire a good part value of the machine indicating a total number of good parts processed by the machine during the processing period;

calculate, via the one or more processors, an overall equipment energy effectiveness (OEEE) of the machine based on a ratio of the modified process energy information of the machine to a production energy information of the machine and based on a ratio of the good part value of the machine to the total part value of the machine;

determine, via the one or more processors, one or more inefficient machines according to the OEEE;

perform further analysis and/or maintenance on the one or more inefficient machines; and display the OEEE to a user.

2. The one or more non-transitory computer-readable storage media of claim 1 wherein the program instructions that direct the computing system to calculate the OEEE direct the computing system to:

determine, via the one or more processors, the ratio of the modified process energy information of the machine to the production energy information of the machine by dividing the modified process energy information of the machine by the production energy information of the machine; and determine, via the one or more processors, the ratio of the good part value of the machine to the total part value of the machine by dividing the good part value of the machine by the total part value of the machine; and wherein the program instructions that direct the computing system to combine the unproductive energy information with the process energy information of the machine further direct the computing system to add the unproductive energy information to the process energy information of the machine.

3. The one or more non-transitory computer-readable storage media of claim 1 wherein the machine is upstream to the downstream machine;

wherein the program instructions further direct the computing system to:

acquire process energy information of the downstream machine indicating an amount of energy used by the downstream machine during the processing period;

acquire a good part value of the downstream machine indicating a total number of good parts processed by the downstream machine during the processing period; and acquire a total part value of the downstream machine indicating a total number of parts expected to be processed by the downstream machine during the processing period.

4. The one or more non-transitory computer-readable storage media of claim 3 wherein the program instructions further direct the computing system to:

acquire unproductive energy information of the downstream machine indicating an amount of energy used by the downstream machine during the portion of the down period in which the downstream machine was prevented from receiving one or more parts at least due to the machine being inactive in the industrial automation process; and generate modified process energy information of the downstream machine by subtracting the unproductive energy information of the downstream machine from the process energy information of the downstream machine.

5. The one or more non-transitory computer-readable storage media of claim 4 wherein the program instructions further direct the computing system to calculate a re-allocated OEEE for the downstream machine based on a ratio of the modified process energy information of the downstream machine to a production energy information of the downstream machine and based on a ratio of the good part value of the downstream machine to the total part value of the downstream machine.

6. The one or more non-transitory computer-readable storage media of claim 1 wherein the machine is downstream to the upstream machine;

wherein the program instructions further direct the computing system to:

acquire process energy information of the upstream machine indicating an amount of energy used by the upstream machine during the processing period;

acquire a good part value of the upstream machine indicating a total number of good parts processed by the upstream machine during the processing period; and acquire a total part value of the upstream machine indicating a total number of parts expected to be processed by the upstream machine during the processing period.

7. The one or more non-transitory computer-readable storage media of claim 6 wherein the program instructions further direct the computing system to:

acquire unproductive energy information of the upstream machine indicating an amount of energy used by the upstream machine during the portion of the down period in which the upstream machine was prevented from delivering one or more parts at least due to the machine being inactive in the industrial automation process; and generate modified process energy information of the upstream machine by subtracting the unproductive energy information of the upstream machine from the process energy information of the upstream machine.

8. The one or more non-transitory computer-readable storage media of claim 7 wherein the program instructions further direct the computing system to calculate a re-allocated OEEE for the upstream machine based on a ratio of the modified processes energy information of the upstream machine to a production energy information of the upstream machine and based on a ratio of the good part value of the upstream machine to the total part value of the upstream machine.

9. The one or more non-transitory computer-readable storage media of claim 1 wherein the program instructions that direct the computing system to acquire the unproductive energy information indicating a sum of energy used by at least one of the upstream machine and the downstream machine during at least the portion of the down period further direct the computing system to acquire a sum of energy used by all upstream machines of the one or more machines and all of the downstream machines of the one or more machines during at least the portion of the down period, wherein the upstream machines are located upstream of the machine and the downstream machines are located downstream of the machine.

10. A computer implemented method for providing energy effectiveness information for an industrial automation system, the method comprising:
via one or more processors that track an amount of energy used by the industrial automation system, acquiring production energy information indicating a sum of energy used by each machine of one or more machines of the industrial automation system during a processing period comprising a production period in which a machine of the one or more machines is active in an industrial automation process and a down period in which the machine is inactive in the industrial automation process;
via the one or more processors that track the amount of energy used by the industrial automation system, acquiring process energy information of the machine indicating an amount of energy used by the machine during the processing period;
via the one or more processors that track the amount of energy used by the industrial automation system, acquiring unproductive energy information indicating a sum of energy used by at least one of an upstream machine and a downstream machine during at least a portion of the down period, wherein the sum of energy used by at least one of the upstream machine and the downstream machine was consumed at least due to the machine being inactive in the industrial automation process;
combining the unproductive energy information with the process energy information of the machine to generate modified process energy information of the machine;
acquiring a total part value of the machine indicating a total number of parts expected to be processed by the machine during the processing period;
acquiring a good part value of the machine indicating a total number of good parts processed by the machine during the processing period;
calculating, via the one or more processors, an overall equipment energy effectiveness (OEEE) of the machine based on a ratio of the modified process energy information of the machine to a production energy information of the machine and based on a ratio of the good part value of the machine to the total part value of the machine;
determining, via the one or more processors, one or more inefficient machines according to the OEEE;
performing further analysis and/or maintenance on the one or more inefficient machines; and
displaying the OEEE to a user.

11. The method of claim 10 wherein calculating the OEEE comprises:
determining, via the one or more processors, the ratio of the modified process energy information of the machine to the production energy information of the machine by dividing the modified process energy information of the machine by the production energy information of the machine; and
determining, via the one or more processors, the ratio of the good part value of the machine to the total part value of the machine by dividing the good part value of the machine by the total part value of the machine; and
wherein combining the unproductive energy information with the process energy information of the machine further comprises adding the unproductive energy information to the process energy information of the machine.

12. The method of claim 10 wherein the machine is downstream to the upstream machine;
wherein the method further comprises:
acquiring process energy information of the upstream machine indicating an amount of energy used by the upstream machine during the processing period;
acquiring unproductive energy information of the upstream machine indicating the amount of energy used by the upstream machine during the portion of the down period in which the upstream machine was prevented from delivering one or more parts at least due to the machine being inactive in the industrial automation process; and
generating modified process energy information of the upstream machine by subtracting the unproductive energy information of the upstream machine from the process energy information of the upstream machine.

13. The method of claim 12 wherein the method further comprises:
acquiring a good part value of the upstream machine indicating a total number of good parts processed by the upstream machine during the processing period;
acquiring a total part value of the upstream machine indicating a total number of parts expected to be processed by the upstream machine during the processing period; and
calculating, via the one or more processors, a re-allocated OEEE for the upstream machine based on a ratio of the modified process energy information of the upstream machine to a production energy information of the upstream machine and based on a ratio of the good part value of the upstream machine to the total part value of the upstream machine.

14. The method of claim 10 wherein the machine is upstream to the downstream machine;
wherein the method further comprises:
acquiring process energy information of the downstream machine indicating an amount of energy used by the downstream machine during the processing period;
acquiring unproductive energy information of the downstream machine indicating the amount of energy used by the downstream machine during the portion of the down period in which the downstream machine was prevented from receiving one or more parts at least due to the machine being inactive in the industrial automation process; and
generating modified process energy information of the downstream machine by subtracting the unproductive energy information of the downstream machine from the process energy information of the downstream machine.

15. The method of claim 14 further comprising:
acquiring a good part value of the downstream machine indicating a total number of good parts processed by the downstream machine during the processing period;
acquiring a total part value of the downstream machine indicating a total number of parts expected to be processed by the downstream machine during the processing period; and
calculating, via the one or more processors, a re-allocated OEEE for the downstream machine based on a ratio of the modified process energy information of the downstream machine to a production energy information of the downstream machine and based on a ratio of the good part value of the downstream machine to the total part value of the downstream machine.

16. A system to provide energy effectiveness information for an industrial automation system, the system comprising:
   an upstream machine that performs a first function to produce a first measurable outcome;
   an industrial machine that performs a second function based on the first measurable outcome to produce a second measurable outcome;
   a downstream machine that performs a third function based on the second measurable outcome to produce a third measurable outcome; and
   a controller programmed to:
      acquire production energy information indicating a sum of energy used by each of the upstream, industrial, and downstream machines to respectively perform the first, second, and third functions during a processing period comprising a production period in which the industrial machine is active in an industrial automation process and a down period in which the industrial machine is inactive in the industrial automation process;
      acquire a success value of the industrial machine indicating a total number of second measurable outcomes produced during the processing period;
      acquire total energy information of the industrial machine indicating an amount of energy used by the industrial machine during the processing period;
      acquire unproductive energy information indicating a sum of energy used by at least one of the upstream machine and the downstream machine during at least a portion of the down period, wherein the sum of energy used by at least one of the upstream machine and the downstream machine was consumed at least due to the industrial machine being inactive in the industrial automation process;
      combine the unproductive energy information with the total energy information of the industrial machine to generate modified total energy information of the industrial machine;
      acquire a total outcome value of the industrial machine indicating a total number of second measurable outcomes expected to be produced during the processing period;
      calculate an overall equipment energy effectiveness (OEEE) of the industrial machine based on a ratio of the modified total energy information of the industrial machine to a production energy information of the industrial machine and based on a ratio of the success value of the industrial machine to the total outcome value of the industrial machine;
      determine one or more inefficient machines according to the OEEE; and
      perform further analysis and/or maintenance on the one or more inefficient machines.

17. The system of claim 16 wherein the controller is further configured to display the OEEE to a user.

18. The system of claim 16 wherein the controller is further programmed to:
   determine the ratio of the modified total energy information of the industrial machine to the production energy information of the industrial machine by dividing the modified total energy information of the industrial machine by the production energy information of the industrial machine;
   determine the ratio of the success value of the industrial machine to the total outcome value of the industrial machine by dividing the success value of the industrial machine by the total outcome value of the industrial machine; and
   combine the unproductive energy information with the total energy information of the industrial machine by adding the unproductive energy information to the total energy information of the industrial machine.

19. The system of claim 16 wherein the controller is further programmed to:
   acquire total energy information of the upstream machine indicating an amount of energy used by the upstream machine during the processing period;
   acquire unproductive energy information of the upstream machine indicating the amount of energy used by the upstream machine during the portion of the down period in which the upstream machine was prevented from delivering one or more parts at least due to the industrial machine being inactive in the industrial automation process;
   generate modified total energy information of the upstream machine by subtracting the unproductive energy information of the upstream machine from the total energy information of the upstream machine;
   acquire a successful value of the upstream machine indicating a total number of first measurable outcomes produced by the upstream machine during the processing period;
   acquire a total outcome value of the upstream machine indicating a total number of first measurable outcomes expected to be produced by the upstream machine during the processing period; and
   calculate a re-allocated OEEE for the upstream machine based on a ratio of the modified total energy information of the upstream machine to a production energy information of the upstream machine and based on a ratio of the successful value of the upstream machine to the total outcome value of the upstream machine.

20. The system of claim 16 wherein the controller is further programmed to:
   acquire total energy information of the downstream machine indicating an amount of energy used by the downstream machine during the processing period;
   acquire unproductive energy information of the downstream machine indicating the amount of energy used by the downstream machine during the portion of the down period in which the downstream machine was prevented from receiving one or more parts at least due to the industrial machine being inactive in the industrial automation process;
   generate modified total energy information of the downstream machine by subtracting the unproductive energy information of the downstream machine from the total energy information of the downstream machine;
   acquire a successful value of the downstream machine indicating a total number of third measurable outcomes produced by the downstream machine during the processing period;
   acquire a total outcome value of the downstream machine indicating a total number of third measurable outcomes expected to be produced by the downstream machine during the processing period; and
   calculate a re-allocated OEEE for the downstream machine based on a ratio of the modified total energy information of the downstream machine to a production energy information of the downstream machine and based on a ratio of the successful value of the downstream machine to the total outcome value of the downstream machine.

* * * * *